United States Patent
Dagher et al.

(10) Patent No.: US 7,811,495 B2
(45) Date of Patent: Oct. 12, 2010

(54) COMPOSITE CONSTRUCTION MEMBERS AND METHOD OF MAKING

(75) Inventors: Habib J. Dagher, Veazie, ME (US); Joshua J. Tomblin, Orono, ME (US); Richard F. Nye, Old Town, ME (US); Imad W. El Chiti, Tampa, FL (US); Matthew W. Bodwell, Lewiston, ME (US); Alexander L. Baker, Frankfort, ME (US); Roberto A. Lopez-Anido, Orono, ME (US)

(73) Assignee: University of Maine System Board of Trustees, Bangor, ME (US)

( * ) Notice: Subject to any disclaimer, the term of this patent is extended or adjusted under 35 U.S.C. 154(b) by 726 days.

(21) Appl. No.: 11/642,240

(22) Filed: Dec. 19, 2006

(65) Prior Publication Data

US 2007/0175577 A1 Aug. 2, 2007

Related U.S. Application Data

(63) Continuation-in-part of application No. 11/043,420, filed on Jan. 26, 2005.

(60) Provisional application No. 60/752,233, filed on Dec. 20, 2005.

(51) Int. Cl.
 B29C 53/08 (2006.01)
 B29C 55/22 (2006.01)
 F16L 9/08 (2006.01)
 F16L 9/128 (2006.01)

(52) U.S. Cl. .................... 264/228; 264/314; 264/257; 425/111

(58) Field of Classification Search ............... 264/314, 264/333, 228, 229, 257; 425/111
See application file for complete search history.

(56) References Cited

U.S. PATENT DOCUMENTS 2,999,272 A * 9/1961 Warnken ............... 425/389

(Continued)

FOREIGN PATENT DOCUMENTS

DE 20208538 U1 5/2001

(Continued)

OTHER PUBLICATIONS

Office Action dated Mar. 19, 2008 for U.S. Appl. No. 11/043,420.

(Continued)

*Primary Examiner*—Matthew J. Daniels
(74) *Attorney, Agent, or Firm*—MacMillan, Sobanski & Todd, LLC

(57) ABSTRACT

A method of forming a hollow composite construction member of the type suitable for use as building material includes providing an elongated inflatable mold assembly having a longitudinal axis, a flexible tubular bladder wall defining an elongated inflatable cavity, a reinforcing fabric positioned concentrically around the flexible bladder wall, and a flexible air-impervious outer layer positioned concentrically around the fabric. The bladder wall and the outer layer define an elongated annular space with the fabric positioned therein. Tension is applied longitudinally to the fabric and fluid is introduced into the cavity to at least partially inflate the mold and shape the fabric. The mold is shaped to a desired shape while maintaining the fabric under tension. The elongated annular space and the fabric are infused with a rigidification material. The rigidification material is hardened while maintaining the fabric in tension to form a rigid hollow composite construction member.

13 Claims, 5 Drawing Sheets

U.S. PATENT DOCUMENTS

| | | | |
|---|---|---|---|
| 3,104,441 A | | 9/1963 | Smith |
| 3,111,965 A | * | 11/1963 | Hodge ........................ 138/176 |
| 3,203,143 A | | 8/1965 | Swenson |
| 3,278,116 A | | 10/1966 | Macon |
| 3,457,962 A | * | 7/1969 | Shobert ...................... 138/144 |
| 3,467,354 A | | 9/1969 | Graham |
| 3,470,279 A | * | 9/1969 | Abbott .......................... 264/72 |
| 3,572,002 A | | 3/1971 | Nichols |
| 3,734,670 A | | 5/1973 | Stickler, Jr. |
| 3,896,206 A | * | 7/1975 | Beaver et al. ............... 264/258 |
| 3,925,942 A | | 12/1975 | Hemmelsbach |
| 3,938,922 A | * | 2/1976 | Godley ...................... 425/111 |
| 3,968,605 A | | 7/1976 | Lovgren |
| 4,158,586 A | * | 6/1979 | Usui .......................... 156/175 |
| 4,212,621 A | * | 7/1980 | Michelotti .............. 425/405.2 |
| 4,684,567 A | | 8/1987 | Okamoto et al. |
| 4,700,514 A | | 10/1987 | Reineman |
| 4,722,156 A | | 2/1988 | Sato |
| 4,746,386 A | * | 5/1988 | Sato et al. ................... 156/175 |
| 4,864,797 A | | 9/1989 | Sato et al. |
| 5,245,802 A | | 9/1993 | Davis |
| 5,333,421 A | | 8/1994 | McKenna |
| 5,339,574 A | | 8/1994 | Downing |
| 5,664,373 A | | 9/1997 | Downing |
| 5,791,363 A | | 8/1998 | Moses |
| 6,026,613 A | | 2/2000 | Quiring et al. |
| 6,189,286 B1 | | 2/2001 | Seible et al. |
| 6,564,513 B2 | | 5/2003 | Henbid et al. |
| 6,679,009 B2 | | 1/2004 | Hotes |
| 6,719,492 B1 | | 4/2004 | Heierli |
| 6,832,454 B1 | | 12/2004 | Iyer |
| 7,114,305 B2 | | 10/2006 | Heierli |

FOREIGN PATENT DOCUMENTS

| | | |
|---|---|---|
| DE | 20208538 U1 | 5/2002 |

OTHER PUBLICATIONS

Office Action dated Jul. 24, 2008 for U.S. Appl. No. 11/043,420.
Office Action dated Jan. 16, 2009 for U.S. Appl. No. 11/043,420.
Office Action dated Jun. 1, 2009 for U.S. Appl. No. 11/043,420.

* cited by examiner

COMPOSITE CONSTRUCTION MEMBERS AND METHOD OF MAKING

CROSS REFERENCE TO RELATED APPLICATIONS

This application claims the benefit of U.S. Provisional Application No. 60/752,233 filed Dec. 20, 2005, and is a Continuation-In-Part of currently pending U.S. patent application Ser. No. 11/043,420, filed Jan. 26, 2005, and entitled Rapidly-Deployable Lightweight Load Resisting Arch System, the disclosures of which are incorporated herein by reference.

BACKGROUND

Various embodiments of a composite construction member and methods of making such construction members are described herein. In particular, the embodiments described herein relate to improved composite construction members of the type usually suitable for use as a building material. Examples of such members include lightweight tubular arches and beams.

In the past, there have been several types of technologies that have been used in order to construct short and medium span buried arch bridges, as well as some underground storage facilities and tunnels. These structures are commonly arch-shaped, and typically are covered with a soil overburden which receives traffic or other loading. Arch-shaped construction members are also used in building construction as structural members.

One method for providing such construction members is to use pre-cast concrete structures which are made in one location and then shipped to the construction site. Another system includes the use of cast-in-place concrete structures which are formed at the construction site and then lifted into place by cranes or the like. Yet another technology includes the use of metallic pipe structures. Further, metallic and steel reinforced concrete can be used as construction members. Increasingly, composite materials are being used in the construction industry.

Important factors in selecting construction materials include cost of the materials, ease of transport and installation, durability, weight, length of time for construction, need for lifting equipment for installation, complexity of the construction sequence, overall performance, and overall installed cost. It would be advantageous if improved construction materials and systems for the construction industry could be developed.

SUMMARY

The present application describes various embodiments of a construction member. One embodiment of a method of forming a hollow composite construction member of the type suitable for use as building material includes providing an elongated inflatable mold assembly having a longitudinal axis, a flexible tubular bladder wall defining an elongated inflatable cavity, a reinforcing fabric positioned concentrically around the flexible bladder wall, and a flexible air-impervious outer layer positioned concentrically around the fabric. The bladder wall and the outer layer define an elongated annular space with the fabric positioned therein. Tension is applied longitudinally to the fabric and fluid is introduced into the cavity to at least partially inflate the mold and shape the fabric. The mold is shaped to a desired shape while maintaining the fabric under tension. The elongated annular space and the fabric are infused with a rigidification material. The rigidification material is hardened while maintaining the fabric in tension to form a rigid hollow composite construction member.

In another embodiment, an inflatable mold assembly for forming a hollow composite construction member suitable for use as building material includes a mold assembly. The mold assembly has a longitudinal axis, and further includes a flexible, substantially tubular bladder wall defining an elongated inflatable cavity, a reinforcing fabric positioned concentrically around the flexible bladder wall, and a flexible air-impervious outer layer positioned concentrically around the fabric, with the bladder wall and the outer layer defining an elongated annular space, with the fabric being positioned within the space.

In another embodiment, a system for making a rigid hollow composite construction member includes an inflatable mold assembly for a hollow composite construction member suitable for use as a building material. The inflatable mold assembly is elongated and has a longitudinal axis. The mold assembly further has a flexible, substantially tubular bladder wall defining an elongated inflatable cavity, a reinforcing fabric positioned concentrically around the flexible bladder wall, and a flexible air-impervious outer layer positioned concentrically around the fabric, with the bladder wall and the outer layer defining an elongated annular space, with the fabric being positioned within the space. Apparatus for applying tension to the fabric in a longitudinal direction, apparatus for introducing a fluid into the cavity to inflate the tubular bladder wall, and apparatus for infusing the elongated annular space and the fabric with a rigidification material to form a rigid hollow composite construction member are provided.

In another embodiment, a method of forming a hollow composite construction member of the type suitable for use as a building material includes providing an elongated inflatable mold assembly having a longitudinal axis, wherein the mold has a braided reinforcing fabric extending along the mold assembly. Tension is applied in a longitudinal direction to the fabric and the fabric is infused with a rigidification material while shaping the mold assembly. The rigidification material is hardened while maintaining the fabric in tension to form a rigid hollow composite construction member.

In another embodiment, a method of forming a hollow composite construction member of the type suitable for use as a building material includes providing an elongated inflatable mold assembly having a longitudinal axis. The mold assembly further has a flexible, substantially tubular bladder wall defining an elongated inflatable cavity, a reinforcing fabric positioned concentrically around the flexible bladder wall, the fabric being preimpregnated with a resin material, and a flexible air-impervious outer layer positioned concentrically around the fabric, with the bladder wall and the outer layer defining an elongated annular space, and with the fabric being positioned within the space. Tension is applied in a longitudinal direction to the fabric and a fluid is introduced into the cavity to at least partially inflate the bladder wall and shape the fabric. The mold assembly is shaped to a desired shape while maintaining the fabric under tension. Curing of the resin material is then initiated while maintaining the fabric in tension to form a rigid hollow composite construction member.

Other advantages of the construction member will become apparent to those skilled in the art from the following detailed description, when read in light of the accompanying drawings.

DETAILED DESCRIPTION OF THE INVENTION

Current technologies for producing curved composite structures from an inflatable tubular mold assembly are limited by fabric architecture. In conventional methods for making composite structures from inflatable mold assemblies, each curve geometry requires a unique fabric architecture, which makes it very costly to design and produce a wide range of curved member geometries for the inflatable mold assemblies. With the embodiments illustrated, it is possible to produce a wide range of curved tubular fiber-reinforced polymer composite structural members by rigidifying the inflatable composite structure made with a single inflatable mold assembly, with various curvatures being achievable even though the starting inflatable mold assembly has a single parent fabric architecture. This parent fabric architecture may vary, and still be capable of producing members having any continuous curvature.

The embodiments illustrated and described herein include curved tubular fiber-reinforced polymer composite structural members that are made with an inflatable mold assembly and formed around a curved support and infused with a rigidification material, such as an organic or inorganic polymer material. Continuous fibers that are longitudinally oriented are substantially prevented from buckling when formed to a large curvature, even on the interior side of the structure, by tensioning the ends of the fabric as the rigidification material is infused. This greatly improves the load carrying capacity of the curved tubular fiber-reinforced polymer composite structural member.

The curved tubular fiber-reinforced polymer composite structural members can be produced without structurally significant or substantially visible fiber wrinkling by using a tensioned braided fabric over an inflatable mold. Because the fibers may be placed close to the longitudinal axis of the inflatable mold without substantial fiber wrinkling or buckling, the ultimately produced curved tubular fiber-reinforced polymer composite structural member is capable of efficiently supporting multiple types of loadings for many structures, including but not limited to curved arched bridges, airplane hangars, buried tunnels and bunkers, rapidly-deployable buried arch bridges and long-span culverts.

In one embodiment, a method for forming a curved tubular fiber-reinforced polymer composite structural member of the type suitable for use as a building material is disclosed. The method for forming such curved tubular fiber-reinforced polymer composite structural members eliminates or substantially reduces any of the fiber buckling or wrinkling which causes weaknesses in a finished reinforcement structure. In certain embodiments, the fabric layer comprises a three-dimensional braided fibrous fabric material which is infused with a suitable rigidification material, such as a resin.

Figure 1:
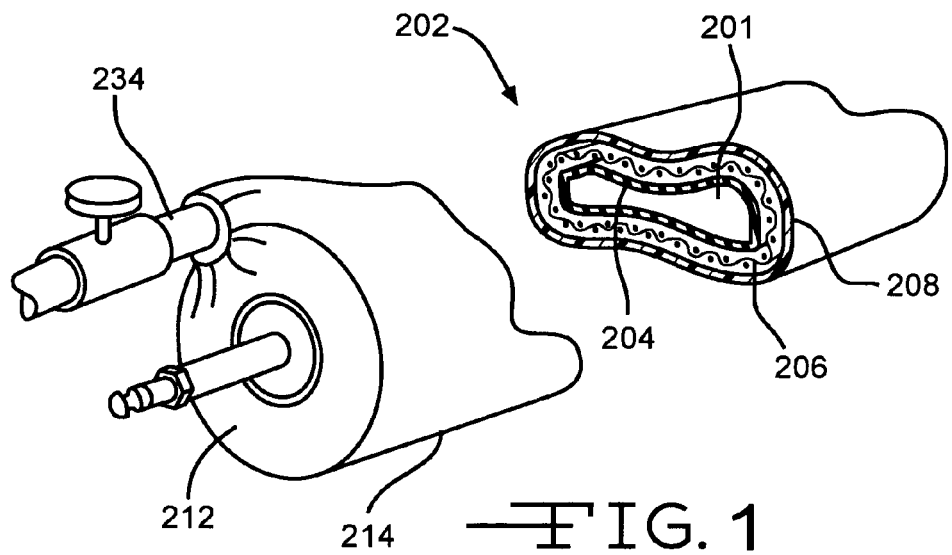
FIG. 1 is a schematic illustration of portions of an inflatable tubular mold assembly for making composite construction members, the mold assembly being in a deflated condition.
Figure 10:
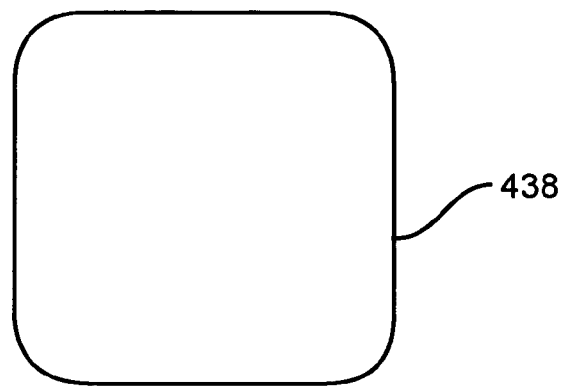
Figure 11:
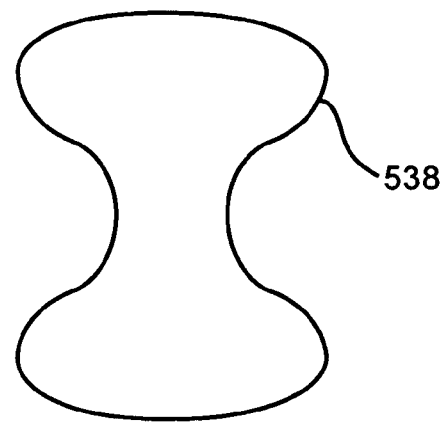

Referring now to FIGS. 1 through 4, an inflatable tubular mold assembly 202 defines an interior cavity 201. FIG. 1 shows the inflatable mold assembly 202 in a deflated condition. While the inflatable mold assembly 202 schematically shown in the figures has a generally circular cross-sectional shape when fully inflated, it is to be understood that the specific dimensions of the inflatable mold assembly 202 are guided by the end use application for which the inflatable mold assembly 202 is being used. For example, the exterior shape of the inflatable bladder 204 in the inflatable mold assembly 202 can have a generally circular, oval, or other useful structural configuration (as shown, for example, in FIGS. 9 through 10). In another embodiment, the inflatable bladder 204 can have a cross-section that has a shape that approximates the cross-sectional shape of an I-beam, as shown in FIG. 11.

Figure 2:
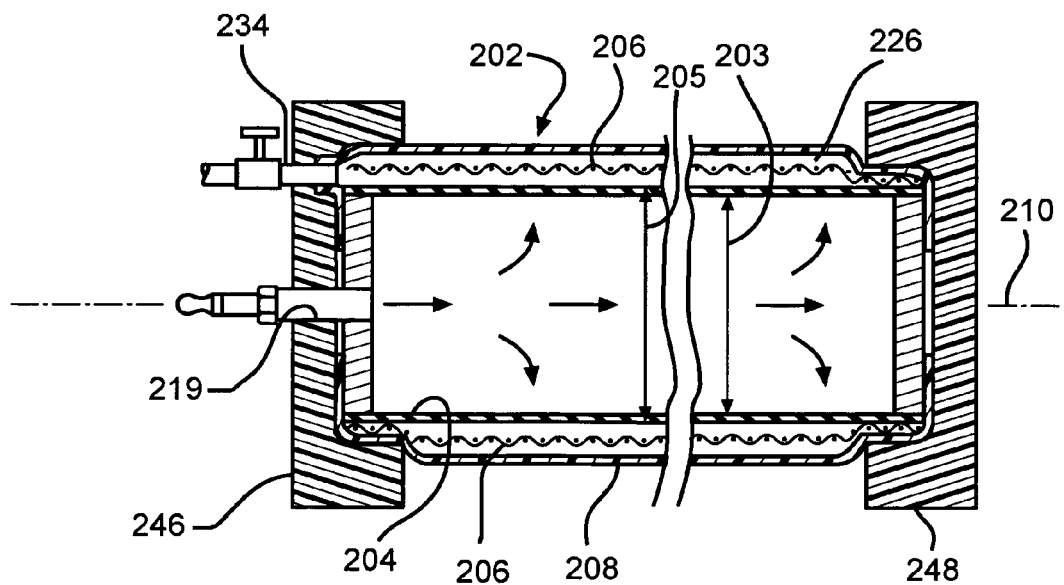
FIG. 2 is a schematic cross-sectional view in elevation of a portion of the mold assembly in a partially inflated condition.
Figure 3:
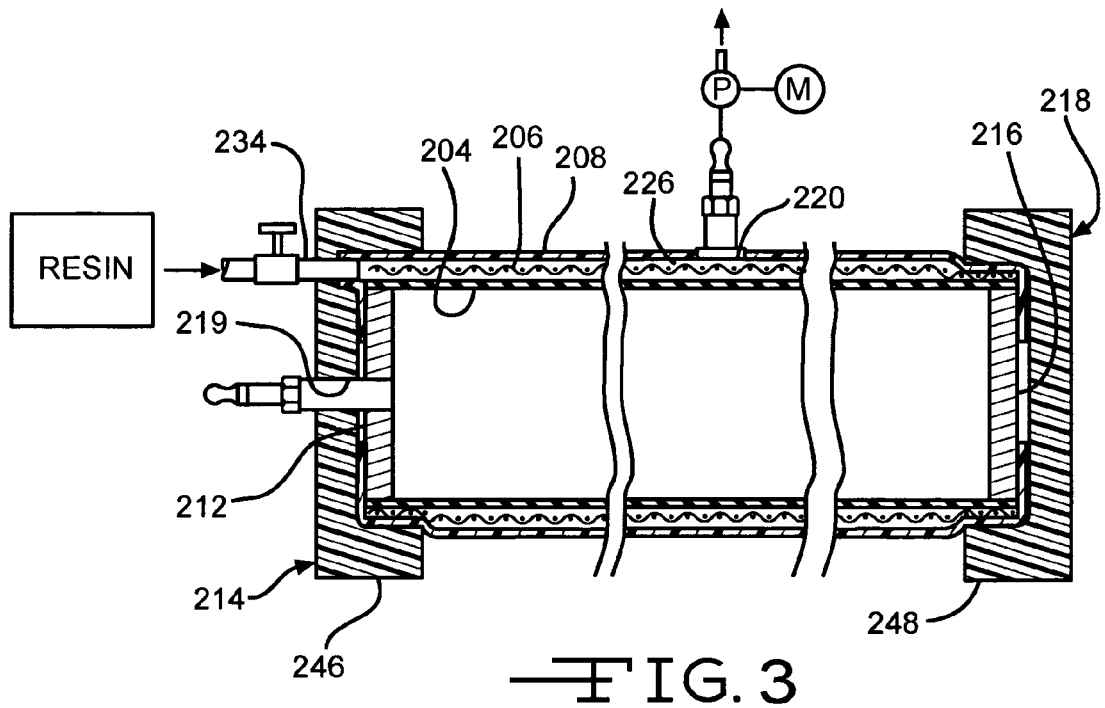
FIG. 3 is a schematic view similar to that of FIG. 2, with the mold assembly fully inflated, and with a partial vacuum applied to the mold assembly.
Figure 4:
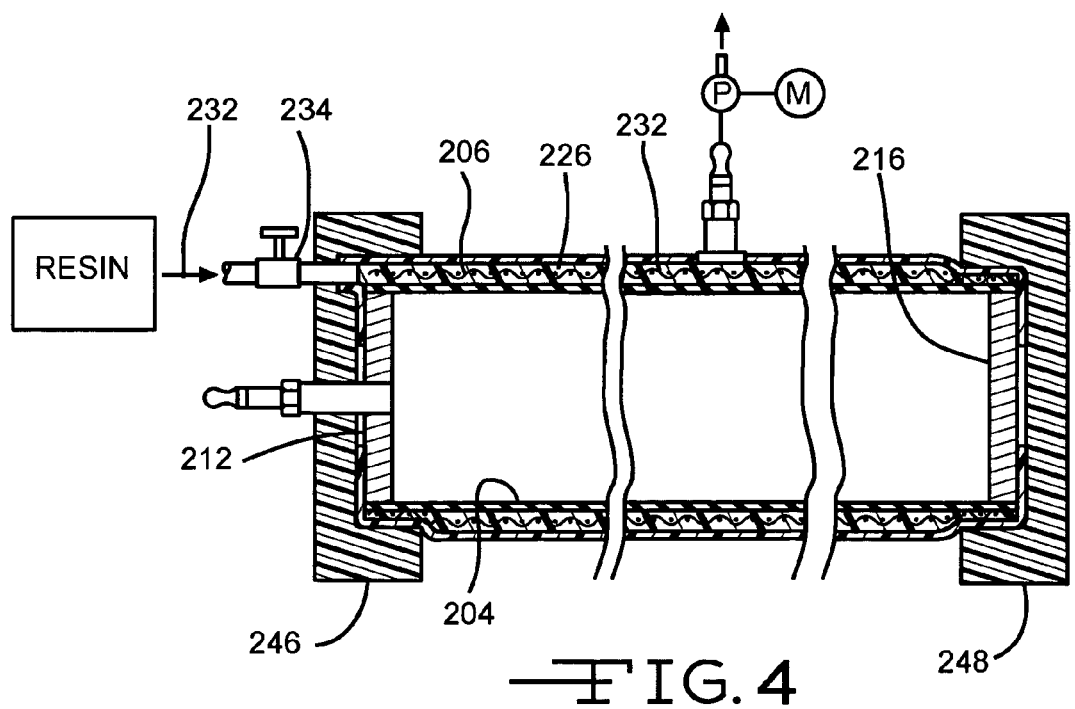
FIG. 4 is a schematic view similar to that of FIG. 2, with the mold assembly undergoing rigidification.
Figure 6:
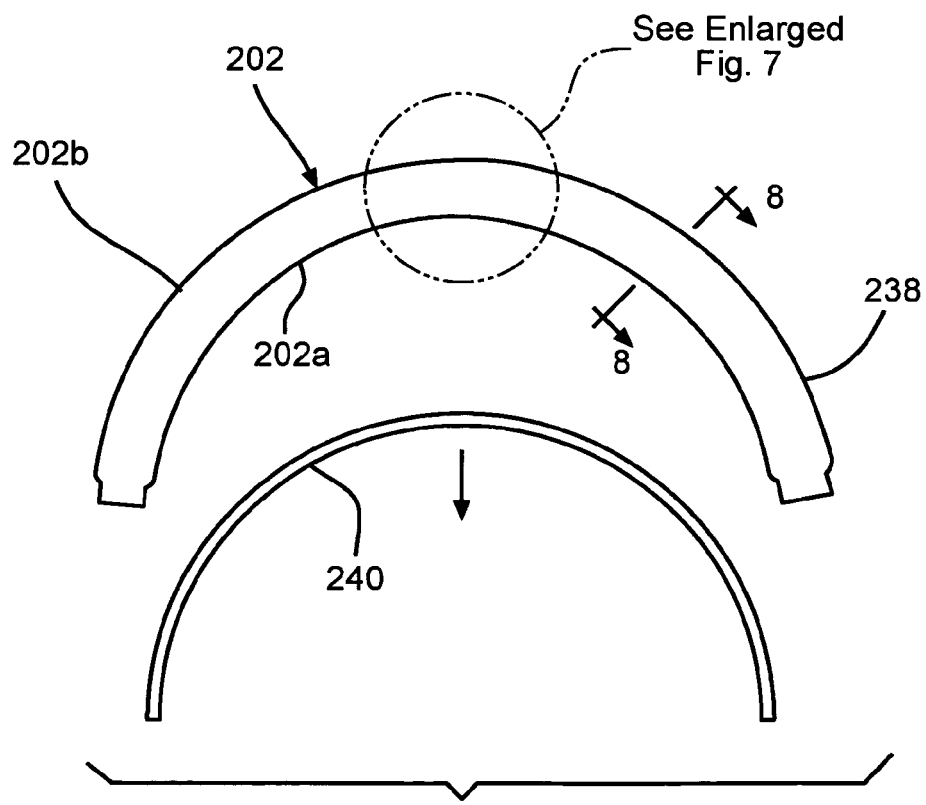
FIG. 6 is a schematic illustration of a rigidified inflatable composite structure after being removed from a form work.

The inner cross-sectional dimension 203 as shown in the FIGS. 2 through 4 is the diameter of the interior of the inflatable bladder 204 when the bladder is inflated. The outer cross-sectional dimension 205 is the diameter of the exterior of the inflatable bladder 204 and the diameter of the interior of the rigidified inflatable composite structure 238, as best shown in FIG. 6. Regardless of the geometric shape of the cross-section of the inflatable mold assembly 202, the curved tubular fiber-reinforced polymer composite structural member 238 (shown in FIG. 6) resulting from use of the inflatable mold assembly 202 is a composite member that is considered to be tubular as described herein.

Also, in certain other embodiments illustrated and described herein, the cross-sectional dimension 205 of the inflatable bladder 204 can vary along its axial or longitudinal length. In such embodiments, the diameter, or major outer cross-sectional dimension 205 of the inflatable bladder 204 can vary such that the finished curved tubular fiber-reinforced polymer composite structural member 238 can have different cross-sectional dimensions at different locations, depending on the needs of the end use application. For example, in certain end use applications, such as for example, an arch, it may be desired that lower portions of the inflatable mold assembly 202 adjacent the ground have a larger cross-section in order to add additional support for the upper portions of the finished curved tubular fiber-reinforced polymer composite structural member 238.

The inflatable mold assembly 202 includes at least one tubular inflatable bladder 204, at least one reinforcing fabric, such as a flexible fabric layer 206, and at least one air-impervious outer layer 208. The wall of the inflatable bladder 204 defines the elongated inflatable cavity, 201. The reinforcing flexible fabric layer 206 is positioned concentrically around the inflatable bladder 204. The flexible air-impervious outer 208 layer is positioned concentrically around the flexible fabric layer 206, with the inflatable bladder 204 and the air-impervious outer layer 208 defining an elongated space 226, with the flexible fabric layer 206 being positioned within the space 226. When the cross-sectional shape of the inflatable bladder 204 is approximately circular, the elongated space has a substantially annular cross-section.

In certain alternative embodiments, the tubular inflatable bladder 204 is made of a suitably flexible air impervious material. Examples of materials that can be used for the tubular inflatable bladder 204 are nylon, Mylar, urethane, butyl rubber, high density polyethylene, vinyl, polyester, reinforced rubber, and silicone. Other materials can also be used. In certain embodiments, the flexible fabric layer 206 comprises a fibrous material having a desired pattern or geometry of fibers, such as braided or woven fibers. In certain alternative embodiments, the fabric layer can comprise one or more types of fibers such as, for example, glass, carbon, polyethylene, polyester, aramid fiber, and mixtures thereof. The air-impervious outer layer 208 can be any suitable flexible air impervious material, such as, for example, nylon, Mylar, urethane, butyl rubber, high density polyethylene, vinyl, polyester, reinforced rubber, and silicone.

In the embodiment shown, the inflatable mold assembly 202 is elongated, having a longitudinal axis 210. The inflatable mold assembly 202 includes a first cap member 212 at a first end 214 of the inflatable mold assembly 202, and a second cap member 216 at an opposed, second end 218 of the inflatable mold assembly 202. The cap member 212 includes a sealable opening 219 through which a fluid material can flow to inflate the inflatable mold assembly 202. In certain embodiments, for example, the fluid material can be gaseous (such as air), or liquid (such as water). Although the mold is shown as being elongated, it is to be understood that it need not be elongated.

FIG. 2 shows the inflatable mold assembly 202 in a partially inflated condition where air is being directed into the interior cavity 201 of the tubular inflatable bladder 204 through the opening 219. As shown in FIG. 3, the air-impervious outer layer 208 can include a sealable opening 220 through which air can be removed from the space 226 between the air-impervious outer layer 208 and the tubular inflatable bladder 204. It is to be understood that the space 226 is at least partially filled with the flexible fabric layer 206. A suitable device for removing air in the space 226 is a vacuum pump P, run by a motor M, although other devices can be used. The opening 220 can be placed anywhere along the length of the inflatable mold assembly 202, including a position at one end of the inflatable mold assembly 202. Any number of openings 220 can be used. It should be understood that the use of an evacuation mechanism is optional, such as, for example, when a resin transfer molding process is used.

During the infuision of the fluid rigidification material 232, such as a resin, the rigidification material is driven or pumped under a pressure differential via resin port 234, through the space 226. At the same time, typically, gas may be removed from the space 226. Any number of resin ports 234 can be used. The resin ports 234 can be placed in the end of the inflatable mold assembly 202 as shown, or through the air-impervious outer layer 208 anywhere along the length of the inflatable mold assembly 202. The resin is infused into and permeates the flexible fabric layer 206. The apparatus disclosed for infusing the rigidification material 232 into the space 226 is merely illustrative, and any suitable system for infusing the flexible fabric layer 206 with the rigidification material can be used.

Figure 7:
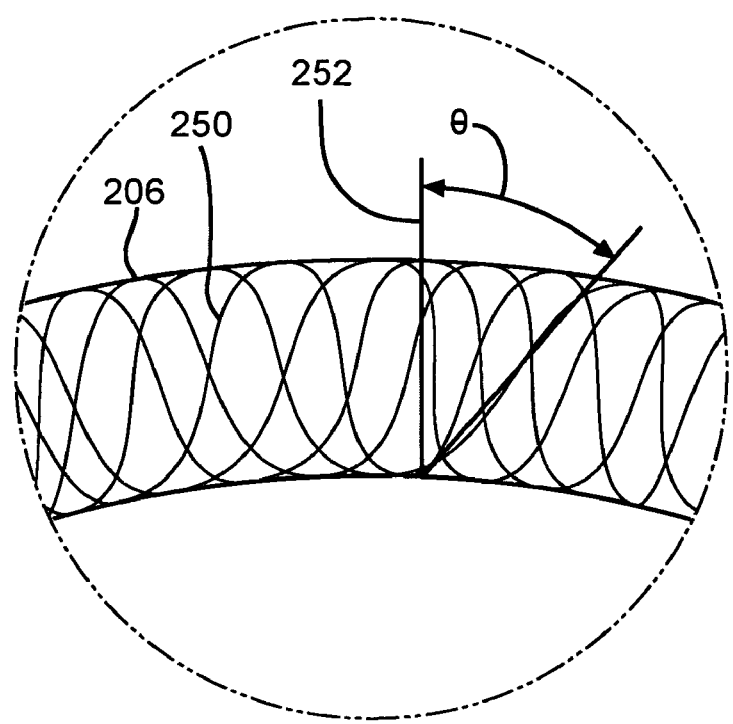
FIG. 7 is an enlarged schematic illustration of an area in FIG. 6 showing a braid angle of fibers in rigidified inflatable composite structure relative to the hoop direction of the rigidified inflatable composite structure.

FIG. 4 shows the rigidification material 232 fully permeating the flexible fabric layer 206. The rigidification material can be any organic or inorganic material that can be pumped into or infused into the space 226, and which then sets or hardens into a rigid or semi-rigid material. Examples of organic materials include thermo-set resins, such as vinyl esters, polyesters, epoxies and the like. Other inorganic materials, such as cements or grouts can be used for the rigidification material. Once the rigidification material 232 is positioned within the space 226 and the rigidification or setting of the material takes place, a composite construction member, such as the curved tubular fiber-reinforced polymer composite structural member 238 shown in FIG. 7, is formed. The curved tubular fiber-reinforced polymer composite structural member 238 is primarily useful as a building material, although it can be used for other purposes.

Figure 5:
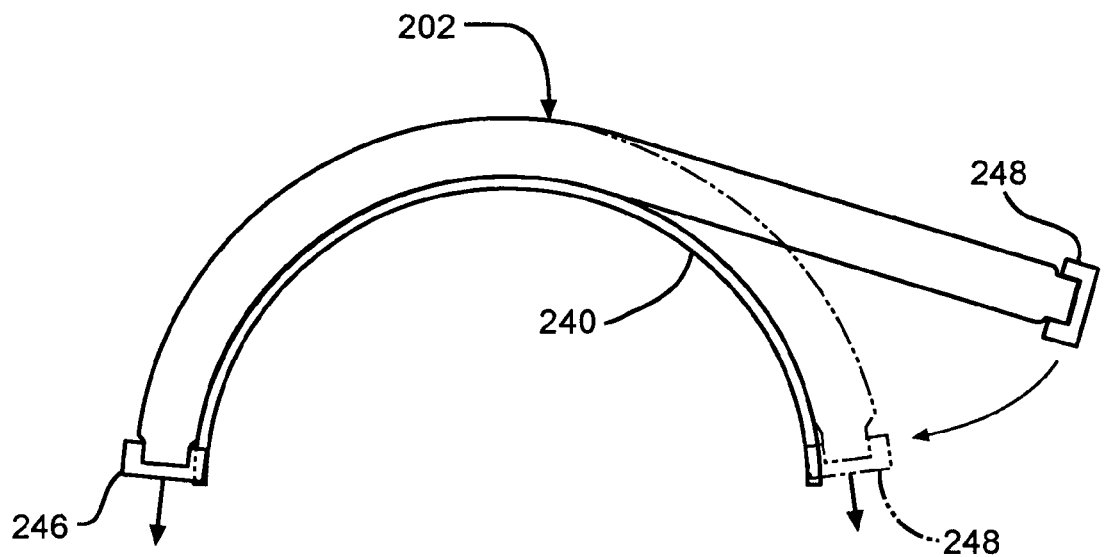
FIG. 5 is a schematic illustration showing an inflated mold assembly being bent around a form work while an external force is being applied tangent to a curvature of the inflated curved mold assembly at a point of contact with the form work, and showing a device for applying tension to an end of the curved mold assembly.

As shown in FIG. 5, during the molding process the inflatable mold assembly 202 is positioned against, or at least partially in, a form work 240, with the inflatable mold assembly 202 bent around or otherwise made to conform to the form work 240. In the embodiment shown, the form work 240 has a continuous semi-circular shape. The form work 240 facilitates bending the inflatable mold assembly 202 to the desired shape during forming. The form work 240 can have any shape suitable for producing a composite construction member of the required configuration.

Figure 9:
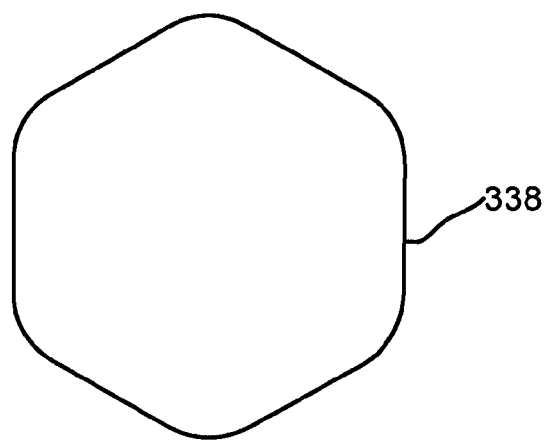
FIGS. 9 through 11 are schematic illustrations of various cross-sectional shapes of additional rigidified inflatable composite structures filled with a load bearing material.

It will be understood that the form work 240 can have any continuous generally curved shape, including compound curves and non-planar curves. In some embodiments, the form work 240 can have non-round side walls such that the inflatable mold assembly 202 can be formed into a composite structure having cross-sectional shapes that are not circular. FIG. 9 shows a rounded hexagonal outline for a composite structure 338. FIG. 10 shows a rounded square outline for a composite structure 438. FIG. 11 shows an approximately I-beam shaped outline for a composite structure 538.

Figure 8:
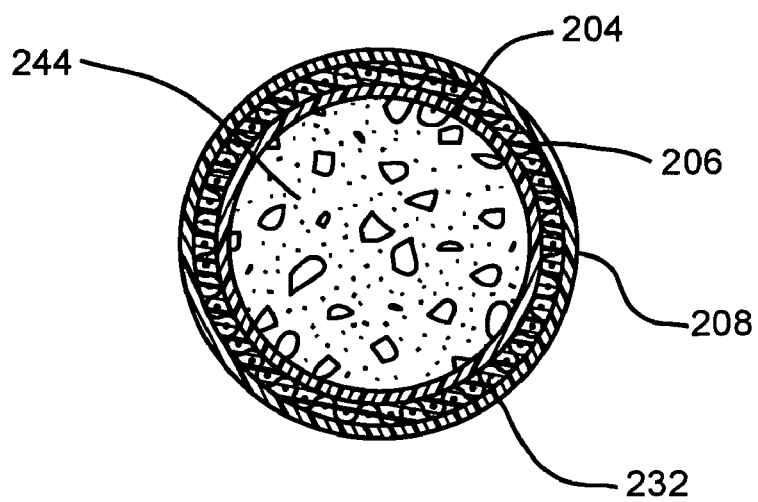
FIG. 8 is a schematic illustration taken along the line 8-8 in FIG. 6, showing a rigidified inflatable composite structure filled with a load bearing material.

Optionally, the rigidified inflatable composite structure 238 can be filled with a load bearing material 244, such as, for example, material selected from the group including non-shrink concrete, expansive concrete, non-shrink grout, expansive grout, foam, sand, and the like, as shown in FIG. 8.

It is to be understood that a suitable external force can being applied tangent to a curvature of the inflatable mold assembly 202 at a point of contact when the inflatable mold assembly 202 is being formed into a generally arcuate longitudinal shape. Also, while the form work 240 shown in the Figures herein supports the inflatable mold assembly 202 along an interior arc 202a of the inflatable mold assembly 202, as shown in FIG. 6, it may be also possible for the form work 240 to provide the desired curvature for the inflatable mold assembly 202 on an exterior arc 202b of the inflatable mold assembly 202.

Advantageously, many different shapes and configurations of rigidified inflatable composite structure 238 can be formed using only one, generally universal type, or architecture, of flexible fabric layer 206. The maker of the inflatable mold assembly 202 is therefore able to use a single type or design of fabric architecture to produce a wide variety of curved tubular fiber-reinforced polymer composite structural members having any desired curvature.

In certain embodiments of the methods described herein, a suitable amount of tension is applied to the fabric in one or both of the hoop (radial) and/or longitudinal (axial) directions to minimize, and optimally substantially eliminate, fiber wrinkling and buckling in the fabric, even when the inflatable mold assembly 202 is bent. The suitable amount of tension may vary, but as used herein, a suitable amount of tension may be an amount of tension which causes a stress in the fibers of about less than about 2 percent of the fiber's ultimate tensile capacity. In the embodiments illustrated and described herein, a tension force which causes within the range of from about 30 p.s.i. to about 1000 p.s.i. of stress in the fibers is applied.

FIG. 7 is an enlarged schematic illustration of an area in FIG. 6 showing a braid angle θ of some of the fibers 250 in the flexible fabric layer 206 relative to the hoop direction 252 of the inflatable mold assembly 202. The hoop direction 252 is that direction which, if followed, would be the shortest planar closed path along the surface of the cross section. For clarity in FIG. 7, most of the fibers in the fabric have been left out, so that the path of the remaining representative fibers is more readily seen. The included angle, θ, is the off hoop direction angle of the fiber. The fibers follow a continuous approximately helical path along the surface of the flexible fabric layer 206 from one end to the other. In FIG. 7 only one fiber angle is shown but multiple layers and angles for each layer may be used in any combination selected for this process, and the angle of individual fibers may vary around the cross-section or along the longitudinal length of the rigidified inflatable composite structure 238.

If any specific fiber is not parallel to the hoop direction 252, then the fiber is oriented in a non-hoop direction, and its deviation from the hoop direction can be measured by the angle θ. Fibers that are oriented at an angle θ that is above a threshold level, such as, for example, 30 degrees, can be considered to have a significant longitudinal component, i.e., they have a significant component in the direction of the longitudinal axis 210. These fibers can be considered to be generally longitudinally extending fibers. The longitudinally extending fibers in the flexible fabric layer 206 are prevented from buckling on a large curvature while the inflatable mold assembly 202 is being bent during the molding process by tensioning the flexible fabric layer 206 as the resin is infused into the flexible fabric layer 206. These are critical fibers from a structural viewpoint, as they carry the bending stresses in the member. Unlike the off-hoop fibers, the hoop-oriented fibers are not susceptible to buckling when a large curvature is applied to the mold assembly.

The curved tubular fiber-reinforced polymer composite structural member 238 can be produced without substantial fiber wrinkling of the generally longitudinally extending fibers, i.e., the fibers initially oriented at an angle greater than about 30 degrees. This is because when a substantial portion of the generally longitudinally oriented fibers are tensioned during the infusion and curing of the resin, the off-hoop fibers are brought into and held in their designed alignment along the outer surface of the inflatable bladder 204, effectively minimizing or eliminating fiber wrinkling or buckling. In certain embodiments, the flexible fabric layer 206 is made with a simple set of repeating patterns such as woven or braided fabrics that have bundles or stands of similarly oriented fibers set in a repeating pattern or desired fabric architecture.

The exemplary methods illustrated and described herein allow for the formation of structural composites that can have any desired shape. The exemplary methods further eliminate the need to first form a fabric that has sections of the fabric material with different weave patterns or fiber configurations in order to form shaped structures.

In certain embodiments, it is desired that certain of the fibers, or bundles of fibers, be oriented, either by tensioning or by their original orientation, into an off-hoop direction of between about 30 and 90 degrees. The restrained or tensioned off-hoop oriented fibers retain their desired orientation without buckling or wrinkling even when the inflatable mold is bent, thereby adding strength to the ultimate curved tubular fiber-reinforced polymer composite structural member 238. During the tensioning of the fabric, the fibers, or bundles of fibers are either pulled or allowed to relax into the desired off-hoop orientation.

It can be seen that by using a flexible fabric layer 206 that is constructed properly, and by using tensioning during the bending and resin infusing process, a single fabric design or architecture can be made to accommodate many different bending configurations. Consequently, the flexible fabric layer 206 is structured to be capable of conforming to molds shaped into various curvatures while still being held under tension.

In certain embodiments, the amount of tension applied to the fabric necessary to overcome fiber wrinkling can be a small fraction of the ultimate tensile capacity of the fabric. The tension on the fabric can be applied using, any suitable device, such as a gripping device. One example of such a gripping device is shown schematically in FIGS. 3 through 5 where gripping systems 246 and 248 are positioned at the ends 214 and 218 of the inflatable mold assembly 202, respectively. The gripping systems apply tension to the flexible fabric layer 206. The gripping systems 246 and 248 can be any mechanisms suitable for connecting to and applying tension to the flexible fabric layer 206. The gripping systems 246 and 248 can be in the form of end rings, or can be a pneumatic expandable plug or a mechanical plug. Further, the elongated inflatable mold assembly 202 can include a vacuum inlet positioned outside of the gripping systems, a vacuum inlet positioned between the gripping systems, or a vacuum inlet positioned inside the gripping systems. Also, the elongated inflatable mold assembly 202 can include a rigidification material inlet positioned outside of the gripping systems, between the gripping systems, or inside the gripping systems. The tension applied by a gripping system can also serve to keep the inflatable mold assembly 202 in contact with the form work 240. In some designs of the inflatable mold assembly 202, the mere inflation of the inflatable bladder 204 is sufficient to cause the fibers to be placed under tension. In such a case, the gripping systems 246 and 248 may act to restrain or control the application of tension to the fibers.

In the embodiments where tension is applied to the flexible fabric layer 206 , the tensioning reduces fiber waviness and increases the weave pattern uniformity, thereby ultimately producing completed curved tubular fiber-reinforced polymer composite structural members 238 having a much higher load carrying capacity than would be produced using otherwise identical un-tensioned fibers. Tensioning of the flexible fabric layer 206 also produces a marked reduction in variation of finished product properties. Also, when the tension is applied to the flexible fabric layer 206, any fibers that reorient will be reoriented by the tensioning closer to the longitudinal axis of the member, thereby ultimately increasing the strength of the final curved tubular fiber-reinforced polymer composite structural member 238. In some embodiments, the fibers of the flexible fabric layer 206 are allowed to realign without substantial wrinkling or buckling as the inflatable mold assembly 202 is being curved. In some embodiments, during the tensioning of the fabric, the gripping of the ends 214 and 218 allow certain of the fibers which are under much higher tension than adjacent fibers to slip until the load is redistributed.

In certain embodiments, the desired tension can be achieved or established before final inflation pressure of the tubular inflatable bladder 204 is reached. For example, the gripping systems 246 and 248 can be tightened on the flexible fabric layer 206 prior to final inflation of the tubular inflatable bladder 204. In other embodiments, once the predetermined geometric shape is achieved, tensioning due to mold elongation motivated by increased bladder pressure will begin to occur.

In certain embodiments, rigidification of the inflatable mold assembly 202 can proceed by infusing the fabric with a resin while the fibers are under tension. Also, the forming of the curved tubular fiber-reinforced polymer composite structural member 238 can be carried out in several different arrangements of steps, including, for example:
  i) positioning a fabric layer over an inflatable tubular wall, inflating the tubular wall to shape the fabric, and infusing the fabric with a rigidification material;
  ii) positioning a fabric layer over an inflatable tubular wall, inflating the tubular wall to shape the fabric, bending the inflated tubular wall into a desired shape, and infusing the shaped fabric with a rigidification material;
  iii) inflating a tubular wall, positioning a fabric layer over the inflated tubular wall, bending the inflated tubular wall and fabric into a desired shape, and infusing the shaped fabric with a rigidification material; and
  iv) positioning a fabric layer over an inflatable tubular wall, partially inflating the tubular wall to shape the fabric, bending the inflated tubular wall into a desired shape, completing the inflation of the tubular wall, and infusing the shaped fabric with a rigidification material. In all of the above arrangements, the fabric is subjected to tension forces.

In an alternate embodiment, the flexible fabric layer 206 is preimpregnated with a resin, and the rigidification process is initiated after or during the shaping process by any suitable mechanism to create the curved tubular fiber-reinforced polymer composite structural member. The rigidification of the resin can be initiated by the infusion of a chemical initiator or catalyst, by the application of heat or light, or by any other suitable method.

In another embodiment, a plurality of the elongated inflatable mold assemblies are arranged together, with tension applied to the fabric of each mold assembly. Each of the plurality of mold assemblies is shaped to a desired shape while maintaining the fabric under tension. The reinforcing fabric in each mold assembly is infused with a rigidification material, and the rigidification material can be infused in each of the mold assemblies either separately or at the same time. In this manner, after the rigidification material is hardened while maintaining the fabric in tension, a multitude of curved tubular fiber-reinforced polymer composite structural members can be formed. The multitude of elongated inflatable mold assemblies can be formed to the same curvature, or can be configured with different curvatures.

The illustrated inflatable mold assembly 202 can be viewed as a precursor for a curved tubular fiber-reinforced polymer composite structural member suitable for use as a building material. The elongated inflatable mold assembly 202 can be used to make curved tubular fiber-reinforced polymer composite structural members in any desired suitable location, such as a construction site of a building, buried bridge structure, or other structure where curved tubular fiber-reinforced polymer composite structural members are needed. Further, the curved tubular fiber-reinforced polymer composite structural members can be filled in place with any desired material, such as non-shrink concrete, expansive concrete, non-shrink grout, expansive grout, foam, and sand. Also, a construction kit, including one or more of the elongated inflatable mold assemblies can be prepared and shipped to a construction site. Such a kit could optionally include a supply of compressed air to inflate the tubular bladder, a source of resin ingredients, a source of vacuum, and a framework suitable both to shape the inflatable mold assemblies during rigidification of the product, and to supply tension during the infusion of the rigidification material. Such a kit can be a self-contained pre-assembled kit for producing curved tubular fiber-reinforced polymer composite structural members of any desired curvature.

The principle and mode of operation of the construction members and methods of making such construction members have been described in its various embodiments. However, it should be noted that the construction members and methods of making such construction members described herein may be practiced otherwise than as specifically illustrated and described without departing from its scope.

What is claimed is:

1. A method of forming a hollow composite construction member of the type suitable for use as building material, the method comprising:
  providing an elongated inflatable mold assembly having a longitudinal axis, and further having:
    a flexible, substantially tubular bladder wall defining an elongated inflatable cavity, wherein the cavity is movable between a deflated condition, an inflated condition, and a plurality of partially inflated conditions;
    a reinforcing fabric positioned concentrically around the flexible bladder wall, wherein the fabric is one of a flexible braided and flexible woven fabric; and
    a flexible air-impervious outer layer positioned concentrically around the fabric, with the bladder wall and the outer layer defining an elongated annular space, with the fabric being positioned within the space;
  applying tension in a longitudinal direction to the fabric and introducing a fluid into the cavity to at least partially inflate the mold and shape the fabric;
  bending the mold assembly along the longitudinal axis to a curved shape while maintaining the fabric under tension;
  infusing the elongated annular space and permeating the fabric with a rigidification material; and
  hardening the rigidification material while maintaining the fabric in tension to form a rigid hollow composite construction member.

2. The method of claim 1 in which the fabric is a braided fabric, and in which the step of applying the tension to the fabric changes the alignment of the fibers in the fabric with respect to the longitudinal axis of the mold.

3. The method of claim 1 wherein the fabric is structured to be capable of conforming to mold assemblies shaped into various curvatures while still being held under tension.

4. The method of claim 3 in which the fabric is a braided fabric, and in which the step of applying the tension changes the angle of the fibers in the fabric with respect to the longitudinal axis.

5. The method of claim 1 including tensioning the fabric before the tubular bladder of the mold assembly is fully inflated, and then fully inflating the tubular bladder.

6. The method of claim 1 wherein the fabric comprises a plurality of fibers, some of which are oriented in an off-hoop direction that is at an angle to a hoop direction, and further wherein the step of applying tension to the fabric during the infusion of the rigidification material prevents buckling of the fibers when curvature is applied to the mold assembly, thereby providing the hollow composite construction member with superior structural properties.

7. The method of claim 1 including the additional step of at least partially filling the rigid hollow composite construction member with a load bearing material selected from the group consisting of non-shrink concrete, expansive concrete, non-shrink grout, expansive grout, foam, and sand.

8. The method of claim 1 in which the elongated inflatable mold assembly includes a mechanical grip at each end, and the mechanical grips are used to apply tension to the fabric.

9. The method of claim 1 including removing the flexible bladder wall from the rigid hollow composite construction member after the rigidification material has hardened.

10. The method of claim 1 in which the elongated inflatable cavity, when inflated, has a cross-sectional dimension that varies along the longitudinal axis of the elongated inflatable mold assembly.

11. The method of claim 1 in which a multitude of the elongated inflatable mold assemblies are arranged together, with tension applied to the fabric of each mold assembly, and further shaping the mold assemblies to a desired shape while maintaining the fabric under tension, and infusing the fabric and the elongated annular spaces with a rigidification material, and hardening the rigidification material while maintaining the fabric in tension to form a multitude of rigid hollow composite construction members.

12. The method of claim 11 in which the multitude of elongated inflatable mold assemblies are all formed to the same curvature, and all are infused simultaneously.

13. The method of claim 1 in which the flexible braided fabric includes fibers longitudinally oriented along a substantially helical path from a first end of the elongated annular space to a second end of the elongated annular space.

* * * * *